United States Patent
Bursk

[11] 3,871,534
[45] Mar. 18, 1975

[54] WALKING BEAM CONVEYOR
[76] Inventor: Max Hubert Bursk, 30603 Winston Dr., Bay Village, Ohio 44140
[22] Filed: July 28, 1972
[21] Appl. No.: 275,954

[52] U.S. Cl................. 214/83.3, 198/203, 198/219
[51] Int. Cl............................................. B60p 1/00
[58] Field of Search................... 198/219, 218, 203; 214/83.3

[56] References Cited
UNITED STATES PATENTS

| | | | |
|---|---|---|---|
| 2,315,205 | 3/1943 | Herold | 198/219 |
| 2,400,763 | 5/1946 | Malo | 198/219 |
| 3,658,171 | 4/1972 | Fukada | 198/219 |
| 3,666,086 | 5/1972 | Brockmann | 198/219 |

*Primary Examiner*—Evon C. Blunk
*Assistant Examiner*—Joseph E. Valenza
*Attorney, Agent, or Firm*—Baldwin, Egan, Walling & Fetzer

[57] ABSTRACT

A walking beam conveyor including a base with a plurality of cam plates disposed on said base. Each cam plate has a top horizontal surface with downwardly extending end portions. A plurality of horizontally movable interconnected carriages are rollably disposed on the cam plates whereby each cam plate has a carriage rollably mounted on the top surface thereof for limited reciprocable movement thereon. A hydraulic or air piston-cylinder mechanism is provided for reciprocating the carriages. Carriage reciprocation may also be effected by mechanical-electrical means. Two pairs of elongated walking beams are rollably disposed on the carriages for limited horizontal movement thereon. Hydraulic or air piston-cylinder mechanisms are provided for moving the beams horizontally. Thus, the carriages move respective pairs of the beams vertically when the carriages are disposed on the downwardly extending end portions of the cam plate top surfaces. All piston-cylinder mechanisms operate in preselected timed sequence whereby at least one pair of beams is always in contact with an associated load alternately carried by said beams and moving such load horizontally at constant speed. Thus, the load is never raised or lowered or intermittently stopped and started, but is moved at a constant speed in a horizontal plane.

14 Claims, 26 Drawing Figures

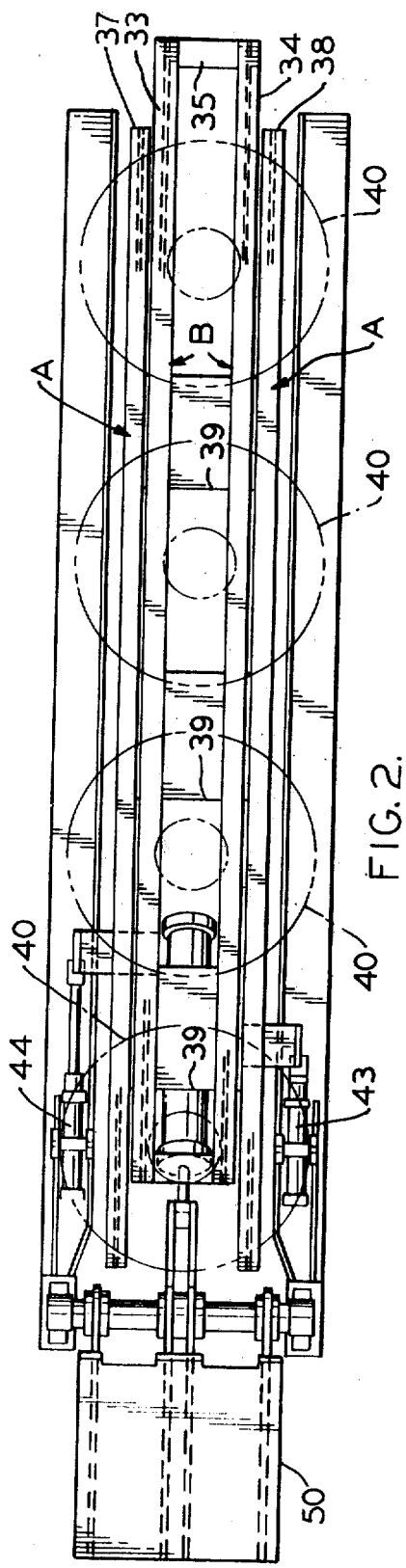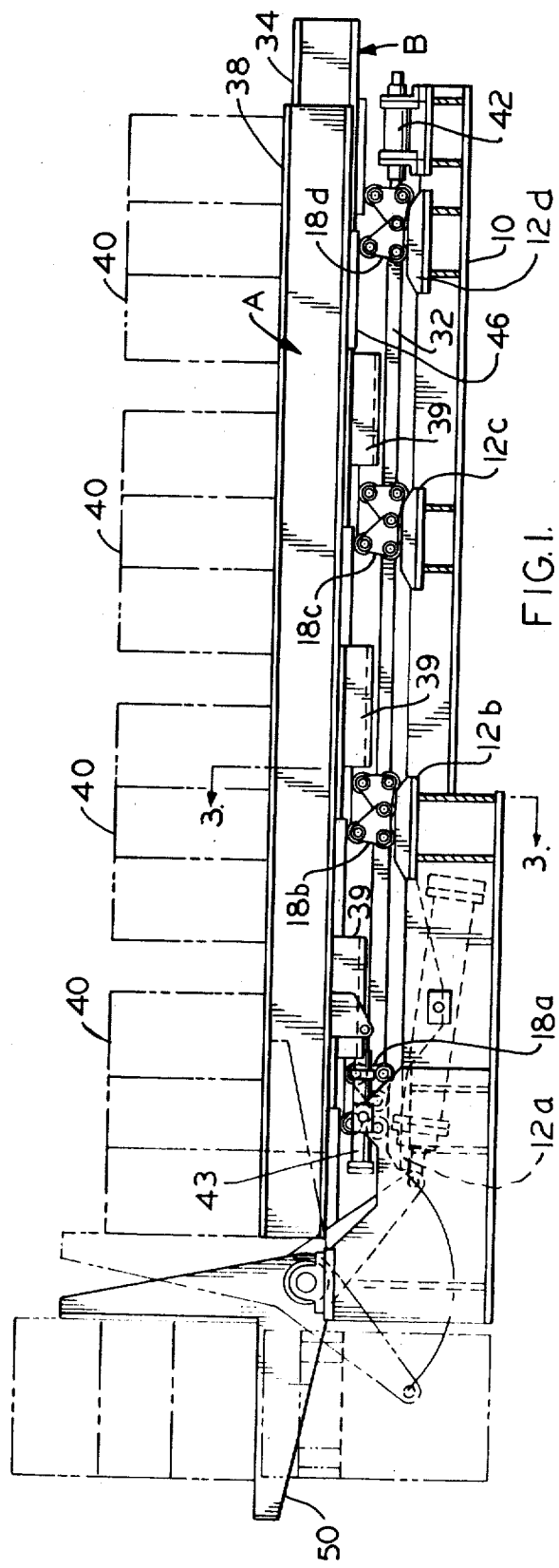

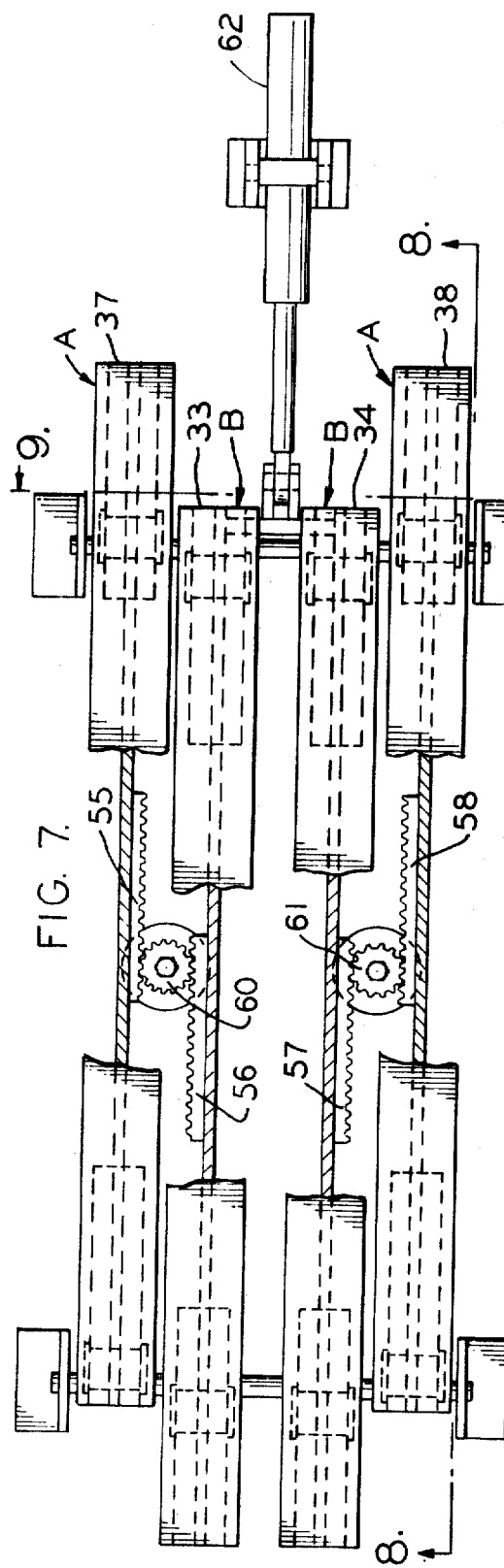
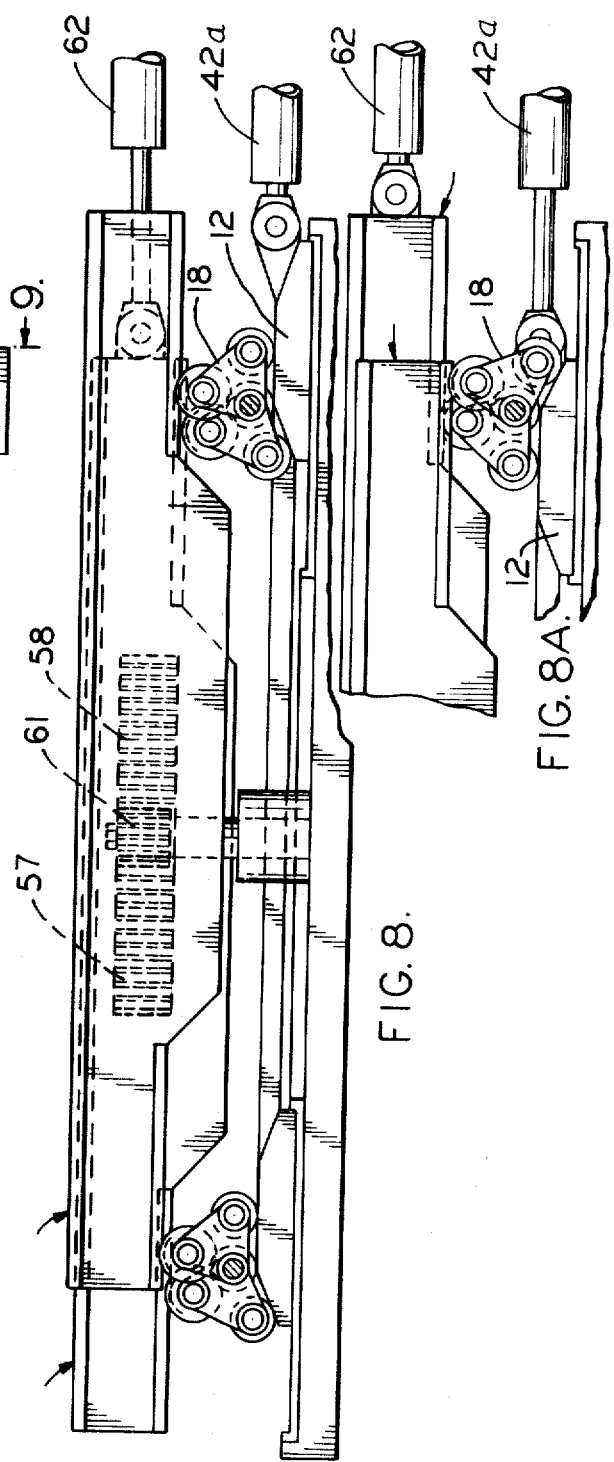
FIG. 7.
FIG. 8.
FIG. 8A.

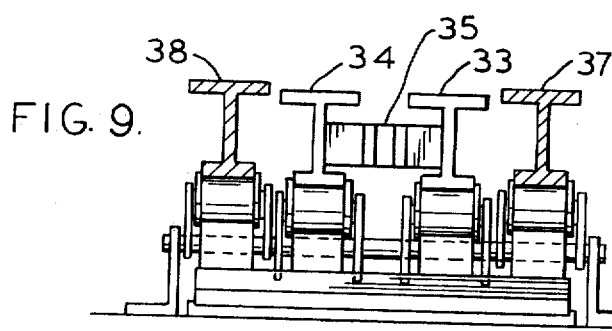
FIG. 9.
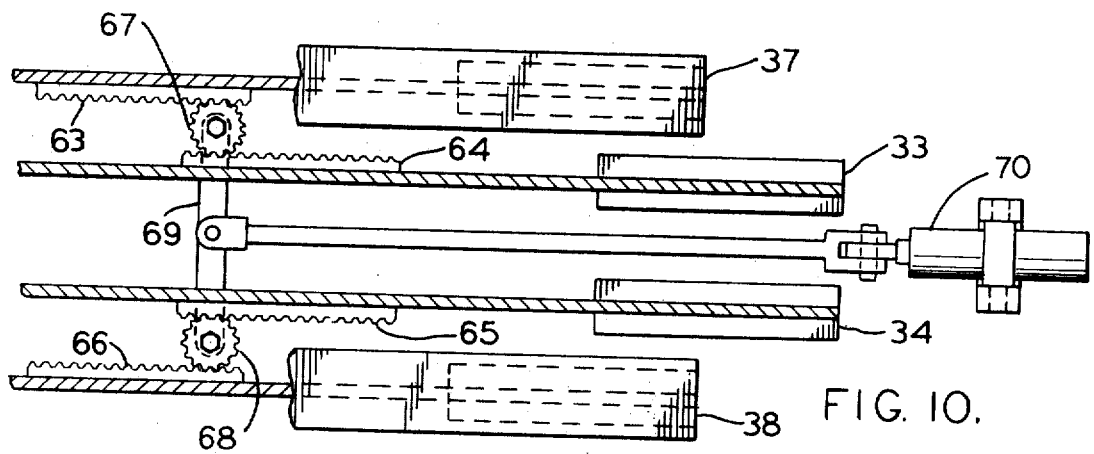
FIG. 10.
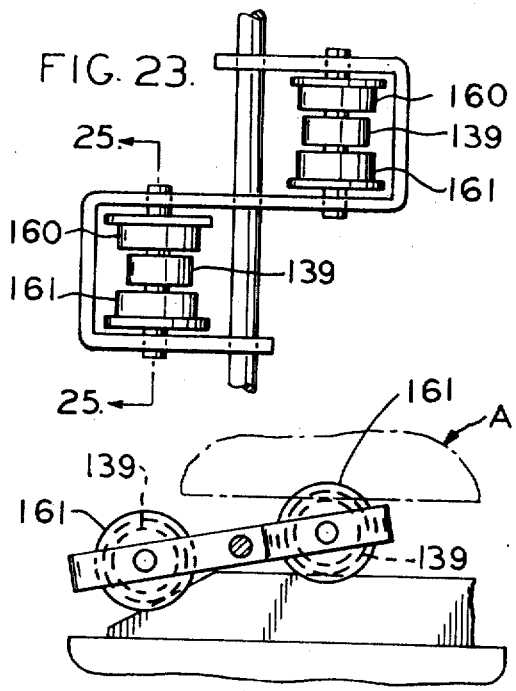
FIG. 23.
FIG. 24.
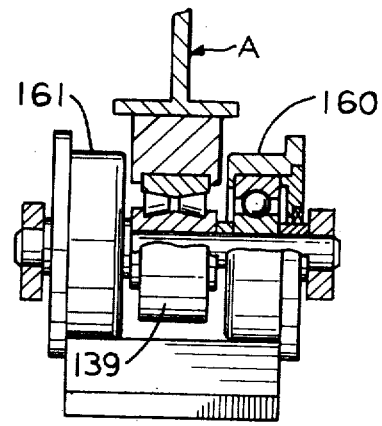
FIG. 25.

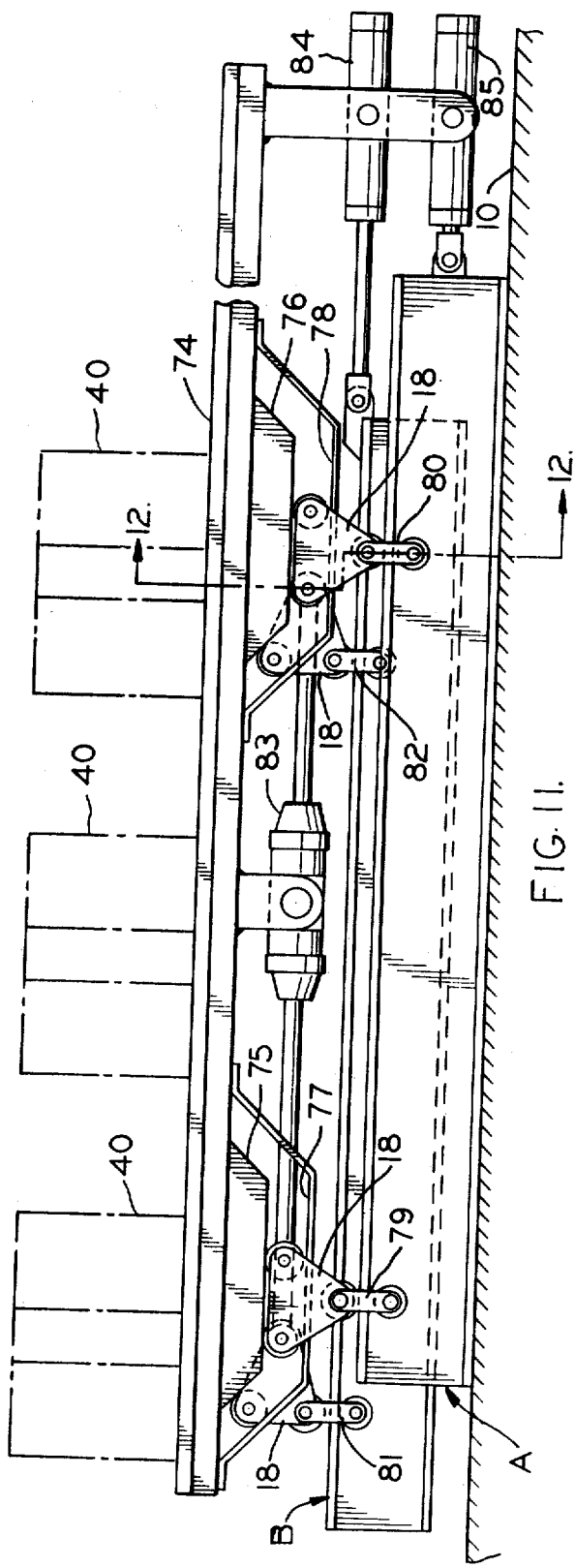
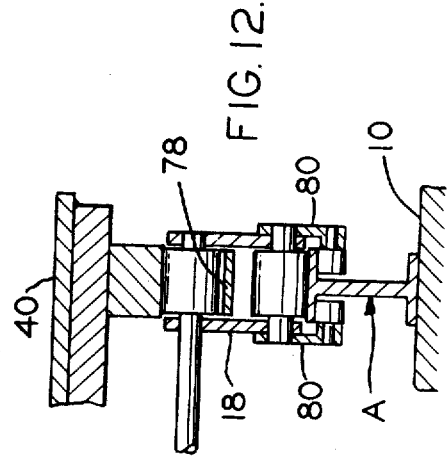
FIG. 11.
FIG. 12.

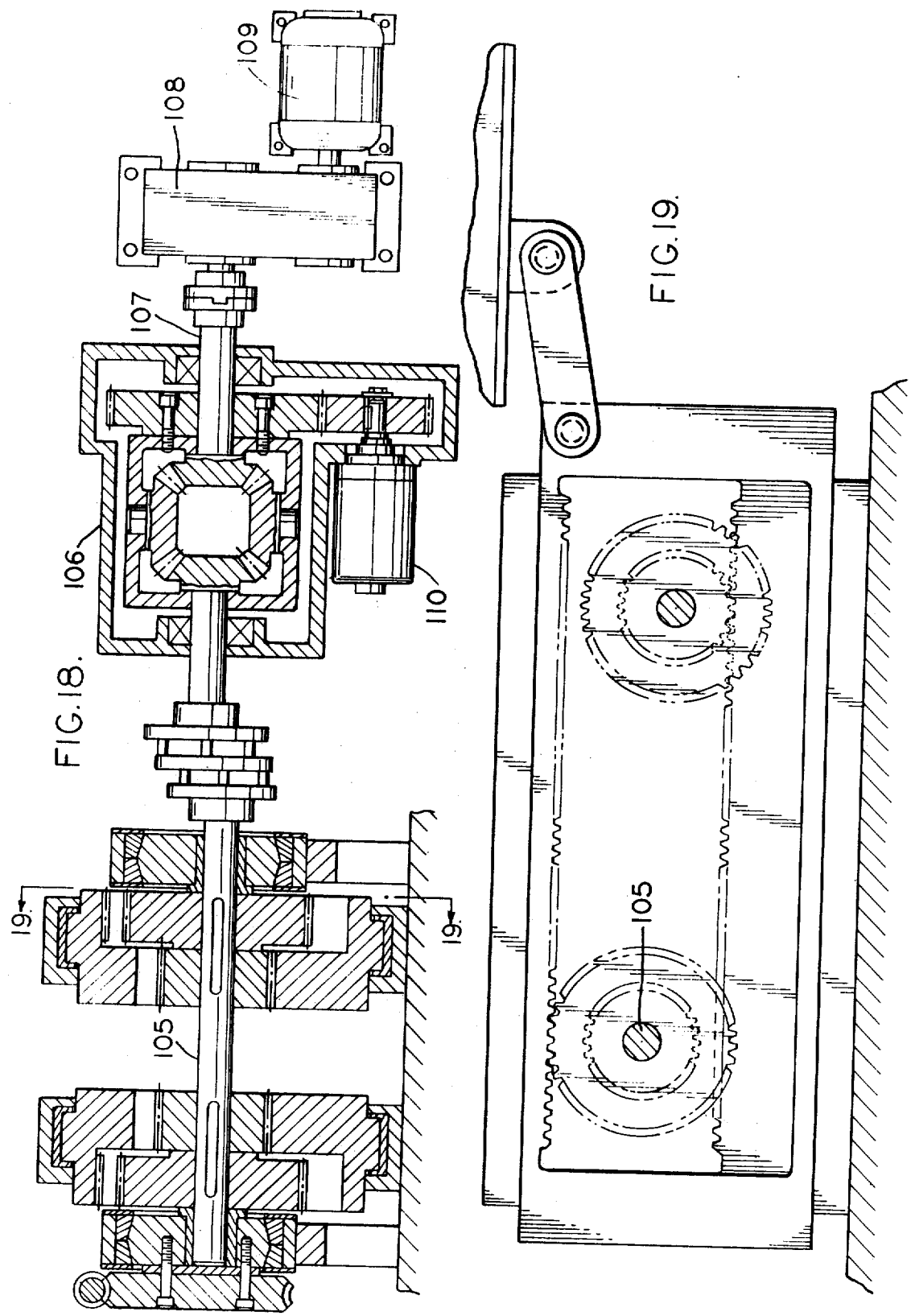

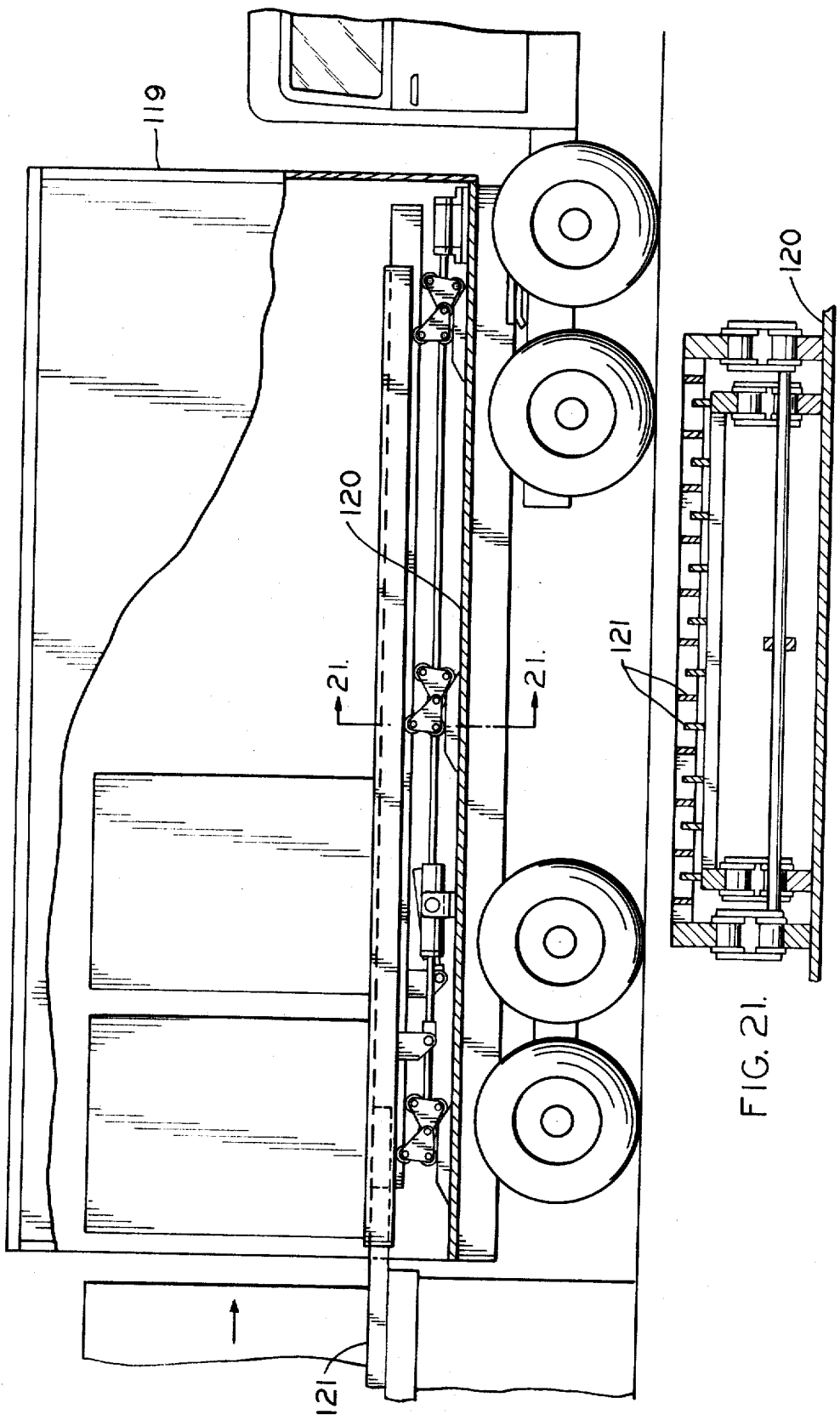

WALKING BEAM CONVEYOR

This invention relates to conveyors, and more particularly, to walking beam conveyors for moving heavy loads over preselected distances.

Prior walking beam conveyors consist generally of a plurality of fixed and moving members or combinations wherein the material or load being moved is intermittently raised and lowered by various means and while either in the raised or lowered position, is traversed generally forward, or in some cases, in reverse by means of the reciprocating member which moves forward to traverse the load while it is displaced from the fixed member. Various means have been used to lift the load — cams, ramps, pivoted arms, straight hoists, eccentrics and the like, operated by air cylinders, hydraulic cylinders, motor driven cranks and eccentric gearing, all of which generally are heavier than required to normally move a load because of the necessity of lifting the load during the traversing operation.

Thus, raising and lowering the load entails serious problems. Not only does this require cumbersome and complicated mechanisms, but such constant raising and lowering is needlessly time-consuming and may be detrimental to many types of loads.

Accordingly, it is an object of the invention to provide a walking beam conveyor that does not raise and lower the load, but moves the load in a horizontal plane at a fixed, constant speed.

A further object of the invention is to provide a walking beam conveyor of the above type that is simple in construction, inexpensive to manufacture, and highly effective in operation.

The invention overcomes the disadvantages of alternately raising and lowering the load by keeping the load in an essentially fixed plane. The load is conveyed by means of reciprocating beam members operating on rollers which are alternately raised and lowered by traversing the rollers from one side to the other of a double cam-like member. The cam members are formed such that the load is always carried on at least one beam member at a fixed distance from the flat portion of the cam, which is parallel to the plane of travel. The beam member or members traverse forward in such manner that the load may be kept moving continuously forward while one or the other member is lowered and reciprocated to the rear, reversed and raised to accept the load while travelling in the forward direction, the first member being lowered while still travelling in the forward direction, and retracting while lowered to repeat the cycle. The timing is such that at the beginning and end of each cycle the load is being supported in the fixed plane by both members, one member being near the start of the forward stroke while the second member is near the end of the forward stroke. This arrangement results in comparatively less powerful means required to accelerate and move the load and less powerful means required to raise and lower the beams since the load itself is not involved in the raising and lowering operation, the supporting members only, being raised and lowered.

A further advantage of the invention is that comparatively short stroke cylinders or cranks can be used to move the loads for longer distances at higher speeds with smaller sources of power, while still having the possibility of providing intermittent movement of the load if so desired.

Another advantage is that by using a plurality of cylinders or driving means, the load may be advanced at increasingly greater intervals or retarded in the same fashion to separate or gather the load as may be required.

Also, by using the configuration of cams and reciprocating members to transport slabs or billets through a heating furnace, for example, it is possible to carry extremely heavy loads at essentially the same plane, to move said loads continuously or intermittently through the furnace, to hold said loads in the soak zone and to alternately raise and lower the reciprocating members without lifting the load but still supporting the load at alternate points on the supporting surface in such manner that prevention of so-called cold spots is achieved, such as occurs on conventional push through or walking beam furnaces where the load is raised and lowered during traverse.

Other objects and advantages of the invention will be apparent from the following description taken in conjunction with the drawings wherein:

FIG. 1 is a front elevational view of a walking beam conveyor of the invention;

FIG. 2 is a top plan view of the structure shown in FIG. 1;

FIG. 7 is a top plan view of one type of drive means used to reciprocate the walking beam of FIG. 1;

FIG. 8 is a view taken along the line 8—8 of FIG. 7;

FIG. 8A is a view of one of the carriages shown in FIG. 8, but showing such carriage in another operative position;

FIG. 9 is a view taken along the line 9—9 of FIG. 7;

FIG. 10 illustrates a modification of the drive means of FIG. 7;

FIG. 11 illustrates an inverted modification of the conveyor shown in FIG. 1;

FIG. 12 is a view taken along the line 12—12 of FIG. 11;

FIG. 18 illustrates a further type of drive apparatus for the walking beams of the FIG. 1 structure;

FIG. 19 is a view taken along the line 19—19 of FIG. 18;

FIG. 20 illustrates a further modification of the apparatus of FIG. 1;

FIG. 21 is a view taken along the line 21—21 of FIG. 20;

FIGS. 23, 24, and 25 illustrate a modified type of carriage roller.

Figure 3:
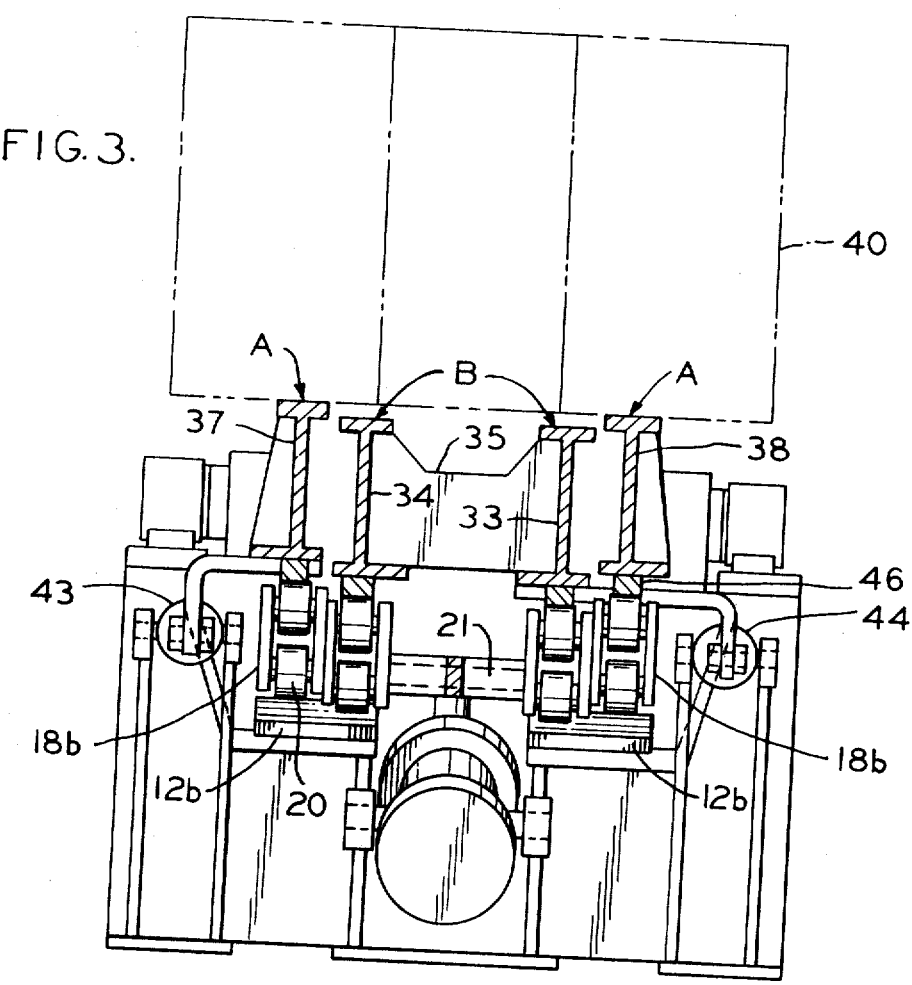
FIG. 3 is an enlarged transverse sectional view taken along the line 3—3 of FIG. 1.

The terms and expressions which are employed are used as terms of description, and not of limitation, and there is no intention, in the use of such terms and expressions, of excluding any equivalents of the parts shown and described, or portions thereof, but it is recognized that various modifications are possible within the scope of the invention claimed.

Referring first to FIGS. 1–3, 5 and 6, there is shown a walking beam conveyor constructed in accordance with the invention and including a base 10, supporting a plurality of spaced hardened steel cam plates 12a, 12b, 12c and 12d. Each cam plate has a top flat surface 14 (FIG. 5) with downwardly extending or tapered end surface portions 15 and 16.

A plurality of carriages 18a, 18b, 18c and 18d are rollably mounted on the cam plates 12a, 12b, 12c and 12d, respectively, for longitudinal reciprocation thereon. Each carriage includes wheels or rollers 20 which are mounted on shafts 21 passing through a pair of interconnected triangular-shaped side members 22,23. Such side members 22,23 carry bottom shafts 24,25 and top shafts 26,27 which support rolls 28,29, respectively, and rolls 30,31, respectively, forming a stable, self-supporting carriage. The carriages are connected together longitudinally by a frame member 32.

The walking beams of the invention include an interconnected outer pair or set of beams A and an interconnected inner pair or set of beams B. The inside set includes the two I-beams 33,34 fastened together by a cross-member 35 to form a cradle or frame. The outer pair of I-beams 37,38 are fastened together by a cross-member 39 to form a cradle or frame outside the inner beam set. Thus, the inner and outer pairs of walking beams form the reciprocating load carrying members of the conveyor for carrying an associated load 40, with each pair of beams being rollably supported on the aforedescribed carriages.

The carriages are longitudinally reciprocated by the air or hydraulic piston-cylinder mechanism 42 mounted on the base 10. The piston cylinder devices herein may be any suitable fluid piston cylinder mechanisms.

The outer set of beams are longitudinally reciprocated by a double-acting hydraulic or air piston-cylinder mechanism 43, and the inner set of beams is longitudinally reciprocated by the double-acting hydraulic or air piston-cylinder mechanism 44.

The underside of the I-beams are provided with wear plates or hardened runways 46 for contacting the opposed carriage rollers and thus also maintain a fixed plane on the beams parallel to the top flat portion of the opposed cam plate.

Figure 5:
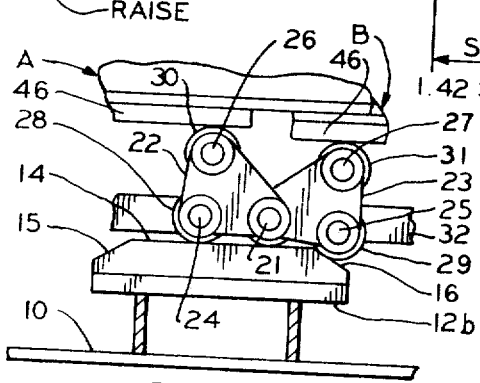
FIG. 5 is an enlarged view of one of the carriages of FIG. 1, and showing such carriage in one operative position.
Figure 6:
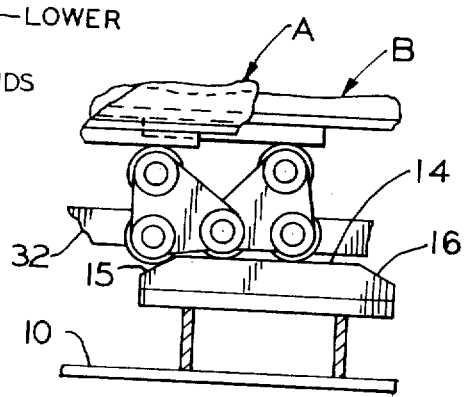
FIG. 6 is a view similar to FIG. 5 but showing the carriage in another operative position.

In operation, with both sets of triangular side plates of the carriages resting on the cam plate top flat portion 14, both inner and outer sets of load bearing members A and B are at the same elevation and share the load. As the carriage is shifted and the outermost rollers of one set of triangular members drop away from the flat portion 14 of the cam plates, the contingent load bearing member B will also be lowered away from the load plane as shown in FIG. 5. FIG. 6 shows the carriage disposed in another operative position at the other end of the cam plate, at which time the other contingent load bearing member A will be lowered away.

As aforementioned, the carriages are shifted by the piston-cylinder mechanism 42, the shift cylinder of which has piston rods at both ends to provide identical forces and speeds when shifting from one end to the other.

A coil down-ender 50 is provided to load coils 40, for example, onto the conveyor. However, since the down-ender forms no part of the invention, it is not described in detail. While the coil down-ender is the preferred method for handling coils of size and weight suitable for this conveyor configuration, other methods and equipment may be used such as overhead cranes, other conveyors or ram and fork trucks, etc.

The conveyor is not limited to the configuration described, but may have multiple load bearing members, operating similarly to the configuration described, such as would be used in cooling beds for bars, rails or structural shapes rolled in rolling mills.

Thus, the invention provides a walking beam conveyor including cooperating interacting sets of elongated walking beams A and B parallel mounted for coacting limited vertical and longitudinal movement with respect to each other. Means are provided connected to the beams for moving the beams vertically and longitudinally in preselected timed sequence whereby at least one pair of walking beams is always moving longitudinally in one direction after being moved generally vertically to effect a steady linear movement in one horizontal plane of an object 40 positioned on the beams A and B when the means is secured to an associated base 10, and to effect steady linear movement of the conveyor in one horizontal plane when the beams are selectively positioned on an associated base 10.

More specifically, the invention includes a walking beam conveyor including cooperating interacting sets of elongated walking beams A and B parallel and horizontally mounted for coacting limited vertical and horizontal movement, with means for moving the beams A and B vertically thence horizontally in timed sequence whereby at least one set of beams is always in contact with an associated load 40 and moving such load horizontally at constant speed in one horizontal plane.

In another form, the invention covers a walking beam conveyor including a base 10, a plurality of spaced cam plates 12 disposed in line on the base, with each cam plate having a top horizontal flat surface 14 including downwardly sloped opposite end portions 15 and 16. Interconnected carriages 18 are rollably disposed on the top surface of the cam plates for limited longitudinal reciprocable movement thereon. Carriage reciprocating means 42 is provided for reciprocating the carriages on the cam plates. At least two pair of inner and outer elongated walking beams A and B are rollably disposed on the carriages 18 in parallel horizontal relationship for limited horizontal movement thereon, whereby each pair of beams is supported on the interconnected carriages. Also provided are beam reciprocating means 43,44 for moving the beams A and B horizontally. The interconnected carriages move the respective pairs of beams A and B vertically when the carriages are moving on the respective downwardly sloped end portions 15 or 16 of the cam plate top surface. The carriage reciprocating means and the beam reciprocating means operate in preselected timed sequence, whereby at least one pair of beams is always in contact with an associated load 40 alternately carried by the beams A and B and moving such load horizontally at constant speed in one horizontal plane.

As aforementioned, the carriages 18 include spaced pairs of interconnected triangular end plates 22,23 having rollers disposed at the apexes of each triangle, with each pair of end plates being connected together at a common apex.

Figure 4:
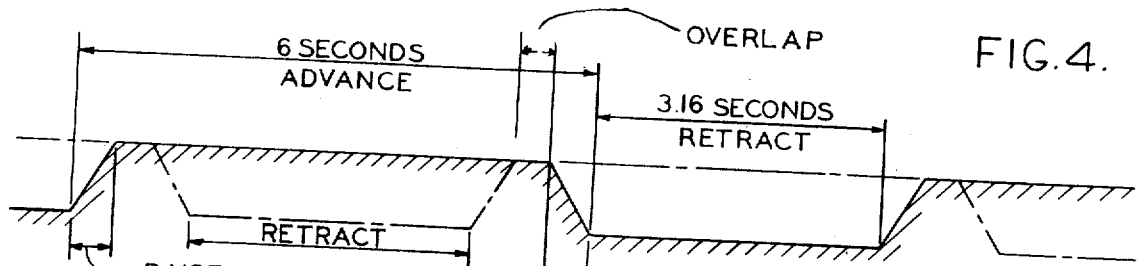
FIG. 4 is a time chart illustrating the timed movement of the inner and outer pairs of walking beams shown in FIGS. 1, 2 and 3.

Referring now to FIG. 4, there is shown a time chart illustrating the coacting timed movement of the inner and outer pairs of beams A and B. The solid line represents the outer set or pair of beams, for example, and the dot-dash line represents the inner pair of beams. The indicated time in seconds is by way of example, it being understood that the timing can be changed to fit the particular load application involved.

Referring to FIGS. 7, 8, 8A and 9, there is shown another form of drive means for reciprocating the inner and outer pairs of beams A and B. In this form of the invention the beam reciprocating means includes coacting oppositely spaced linear gear racks 55, 56, 57, 58 on the inner and outer pairs of beams A and B, with coacting pinion gears 60,61 disposed between and geared to respective gear racks. A hydraulic or air piston-cylinder mechanism 62 is connected to the inner set of walking beams B to reciprocate the same longitudinally, whereby reciprocation of the inner set of beams causes the outer set of beams to reciprocate in the opposite direction in preselected timed sequence to effect movement of the associated load. FIG. 8 shows the carriages 18 in the extreme left position on the cam plates 12 and FIG. 8A shows the carriage in the extreme right position on the cam plate. In this embodiment of the invention, it is possible to provide intermittent motion to the load bearing members A and B using only one cylinder for advance and retract by adding the toothed racks to each load bearing member and placing a pinion between the racks, such pinion rotating on a pin or shaft fixed to the base of the conveyor in such fashion that movement of one load bearing member will cause the opposing member to move in the opposite direction. Also in the modification, the piston-cylinder mechanism 42a shifts the cam plates 12, as the carriages are fixed.

In FIG. 10, the beam reciprocating means includes coacting oppositely spaced linear gear racks 63, 64, 65, 66 on the inner and outer pairs of beams. A coacting pair of pinion gears 67,68 is disposed between and geared to the respective gear racks. A transverse bracket 69 connects the pinion gears. A hydraulic or air piston-cylinder mechanism 70 is connected to the bracket 69 intermediate its ends to reciprocate the pinion gears longitudinally of the beams, thereby reciprocating the inner and outer pairs of walking beams in opposite directions in preselected timed sequence to effect movement of the associated load. With certain modifications, as shown in FIG. 10, it is thus possible to provide continuous motion using only one cylinder. This involves a moving pinion shaft 69 which reciprocates for a short distance, being moved by the shift cylinder 70, which also raises and lowers the load bearing members in the correct order to maintain the load on the same plane. The pinion does not rotate during a portion of this cycle, merely acting as a tie between the two load bearing members while both are moving in the same direction and during the time the driving member is being reversed, said reversal continuing the movement of the driven member when the pinion shaft is stopped at the end of its stroke.

The modification shown in FIGS. 11 and 12 is an upside down version of the conveyor shown in FIG. 1. In other words, there is here provided a moving platform whereby the whole unit is inverted and the load bearing members become the supporting members and the base becomes a platform which remains on one plane while moving forward, propelled by the reciprocating support members. In this version, it is necessary to provide additional guides for the shifting carriage because the load bearing members must be lifted while retracting. The FIG. 11 conveyor includes a platform 74, outer and inner interacting pairs of elongated walking beams A and B operatively disposed on the underside of the platform in parallel relation for coacting limited vertical and horizontal movement with respect to each other and with respect to the platform. Means are connected to the beams and to the platform for moving said pairs of beams vertically and horizontally in preselected timed sequence of the type aforedescribed, whereby the inner and outer sets of beams alternately contact an associated base 10 below the beams to move the platform therealong in a constant linear movement in one horizontal plane. The means include the aforedescribed carriages 18 interposed between the beams and the platform, such platform having preconfigured pendant cam plates 75,76 on its underside and having tracks 77,78 for receiving the carriages rollably therein. The carriages are also rollably connected to the respective pairs of walking beams by the roller brackets 79, 80, 81, 82. A hydraulic piston-cylinder mechanism 83 is disposed on the underside of the platform 74 for moving the carriages in the cam plate tracks 77,78 in a preselected manner. Hydraulic piston-cylinder mechanisms 84,85 are connected to each pair of walking beams and are connected to the platform for horizontally reciprocating the walking beams in coaction with the movement of the carriages to move the conveyor over the associated base with a constant speed with the platform remaining in one horizontal plane.

Figure 13:
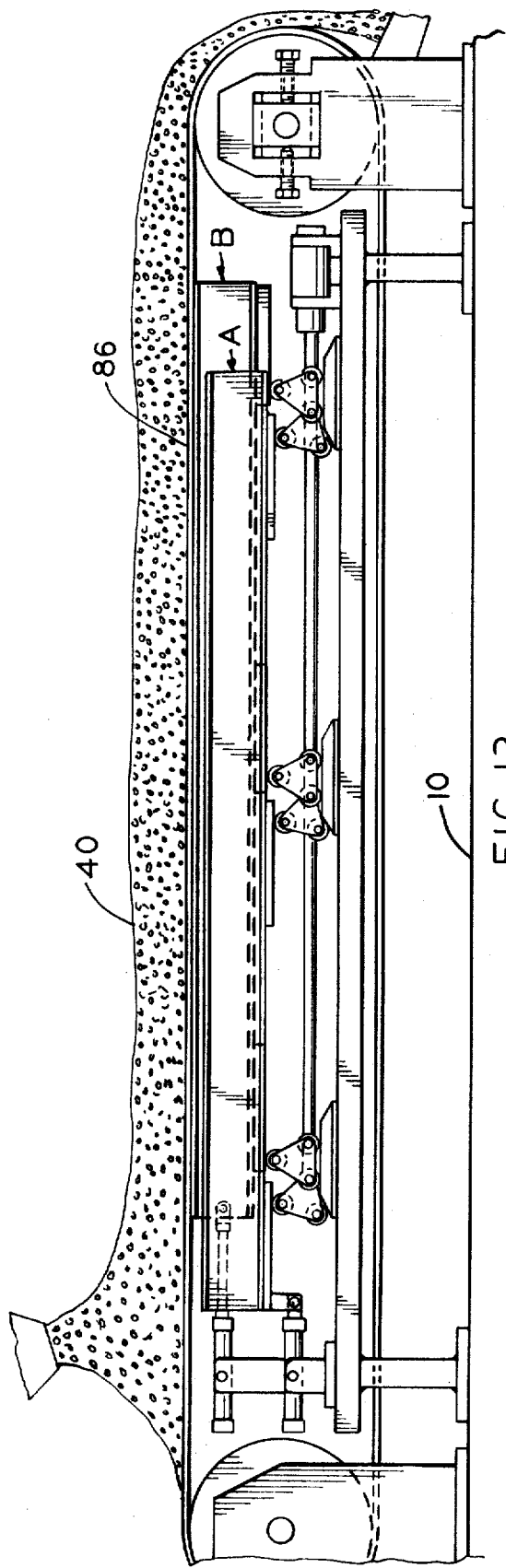
FIG. 13 illustrates a modification of the apparatus shown in FIG. 1.

In the FIG. 13 modification, the walking beam conveyor apparatus of FIG. 1 is formed in coaction with a moving conveyor belt 86 longitudinally disposed on the beams A and B, whereby the beams move the conveyor belt at constant speed. This embodiment of the invention consists of reciprocable members A and B mounted on supports and cam plates as described above, but acting as the support for a rubber or fabric belt 86 or flexible chain type conveyor which must support heavy loads 40 such as might be encountered in moving ore, sand, rock or granular material, wherein the belt acts as a movable floor and the reciprocating load members provide the required support and means for moving the belt or conveyor.

Figure 14:
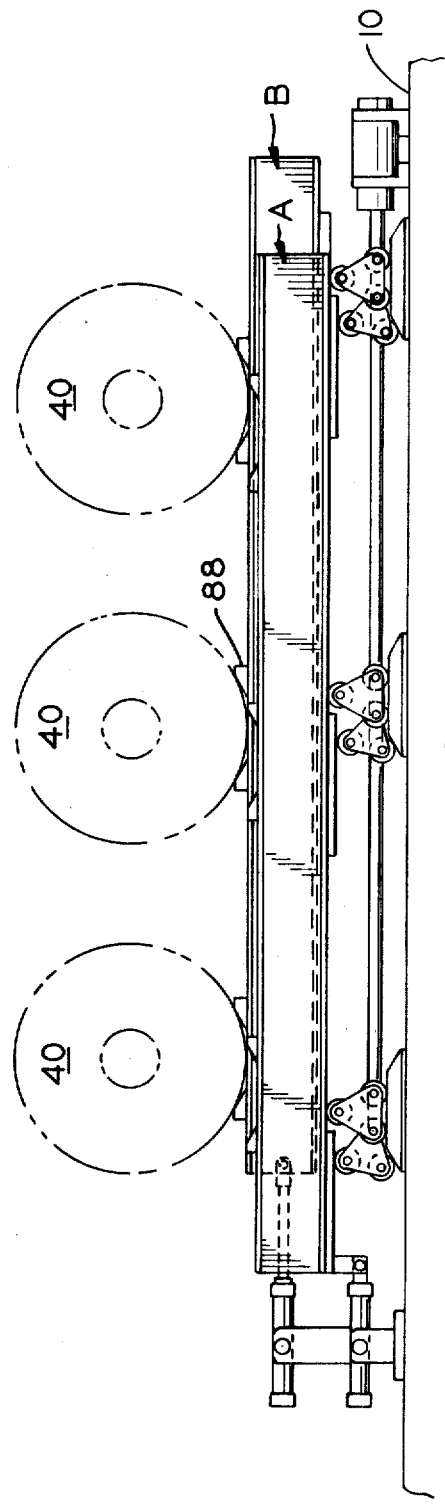
FIG. 14 illustrates a further modification of the apparatus shown in FIG. 1.

In FIG. 14, the conveyor of FIG. 1 is shown and further includes a plurality of spaced dog brackets 88 disposed on the beams A and B for receiving and engaging cylindrical objects thereon such that the beams are adapted to move such cylindrical objects at a constant speed in a single horizontal plane, at spaced intervals.

Figure 15:
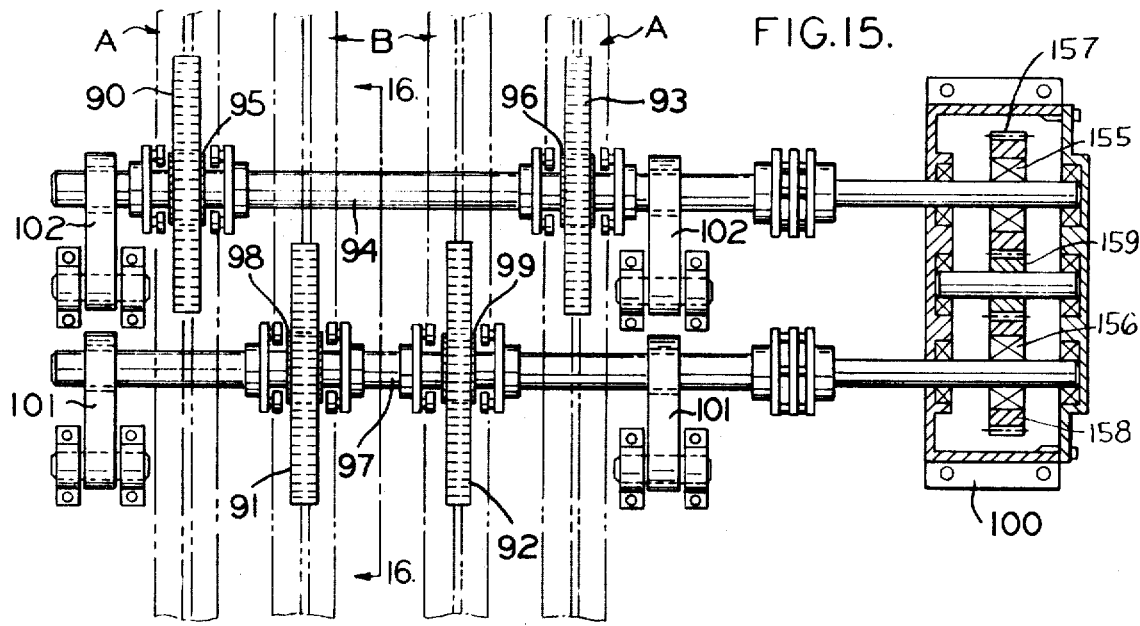
FIG. 15 illustrates a means used to match the speed of the walking beams of FIG. 1.
Figure 16:
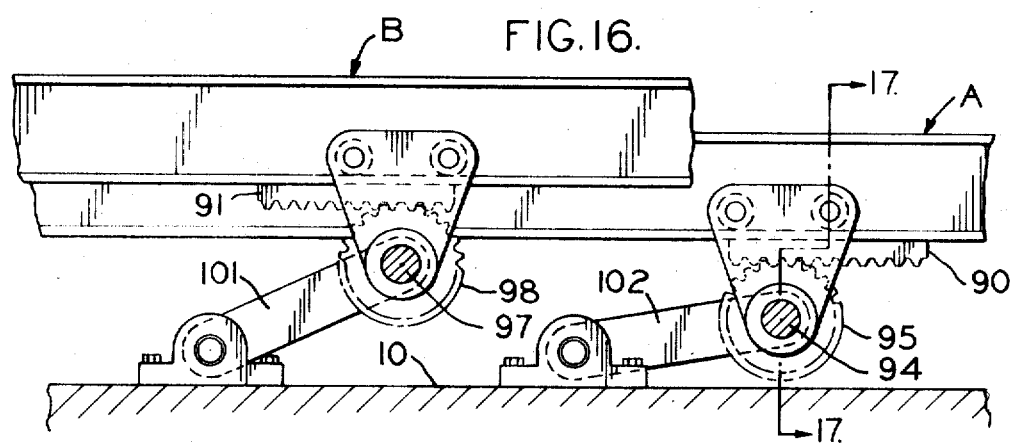
FIG. 16 is a view taken along the line 16—16 of FIG. 15.
Figure 17:
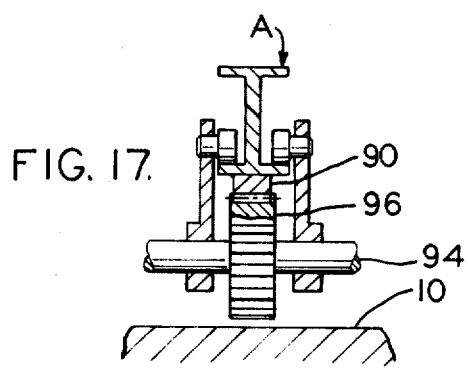
FIG. 17 is a view taken along the line 17—17 of FIG. 16.

FIGS. 15, 16 and 17 illustrate a type of speed matching means which is required when moving heavy loads by means of hydraulic or air cylinders. The unloaded member will move at higher speeds than the loaded beam which is undesirable, when the two beams start to share the load. Thus, FIGS. 15, 16 and 17 illustrate a means to speed match the two sets of beams A and B. With beams A loaded and moving forward, gears 159 and 158 (in gear box 100) are rotated clockwise driven through over-running clutch 156 and pinion 159. Beams B are reciprocated to the rear by means of a hydraulic cylinder, not shown, over-running clutch 155 permitting shaft 94 to rotate counterclockwise. When beams B are then reversed to move forward, over-running clutch 155 prevents a speed greater than that being already developed in gear 157 by action of the loaded beams A. Thus, when beams B are raised to contact the load they are moving at the same speed as beams A. Gear racks 90, 91, 92, 93 disposed on the pairs of beams A and B impart motion to gears 157 and 158 through pinion gears 95,96 and 98,99 respectively, which are mounted on shafts 94 and 97. The pinion gears are held in contact with the racks by means of pivoted arms 101,102 as shown.

In FIGS. 18 and 19 there is shown a further type of beam reciprocating means including gear racks on the inner and outer pairs of beams with a transverse shaft 105 having pinion gears selectively engageable with the respective gear racks, as shown, and with suitable means provided for selectively engaging the pinion gears with either the inner or outer beam gear racks. In this instance there is added a differential 106 connected to said shaft 105, the differential having an input shaft 107. A transmission gear box 108 is connected to the differential input shaft 107, and gear drive means 109 is provided for driving the gear box 108. Also, differential drive means 110 is provided for driving the frame of the differential 106. The differential drive means 110 and the gear box drive means 109 coact in timed sequence to selectively reciprocate said inner and outer walking beams to move the load.

In FIGS. 20 and 21 there is shown the conveyor of FIG. 1 applied to a truck 119 wherein the truck has a flat bed floor 120 and the conveyor is disposed on such flat bed floor. Additionally, the walking beams include elongated channels or telescopic sections 121 movable rearwardly of the truck to thus extend the floor of the truck rearwardly thereof to facilitate loading of the walking beam and the truck. This embodiment uses multiple load bearing members alternating across the width of a truck, railroad car, or floor of a ship, said members forming the bed of the truck, floor of the railroad car or ship. Alternate members would reciprocate with the carriages shifting to maintain the load on a fixed plane supported by the raised members, while the non-load bearing members are retracting. The stroke of the cylinders would be adjusted for the type load to be handled. Provision is made to extend the members for loading externally of the floor, then moving the material into the storage part of the floor, reloading and moving both loads forward and repeating the operation until the truck was full. Reversal of the operation would permit emptying the truck.

Figure 22:
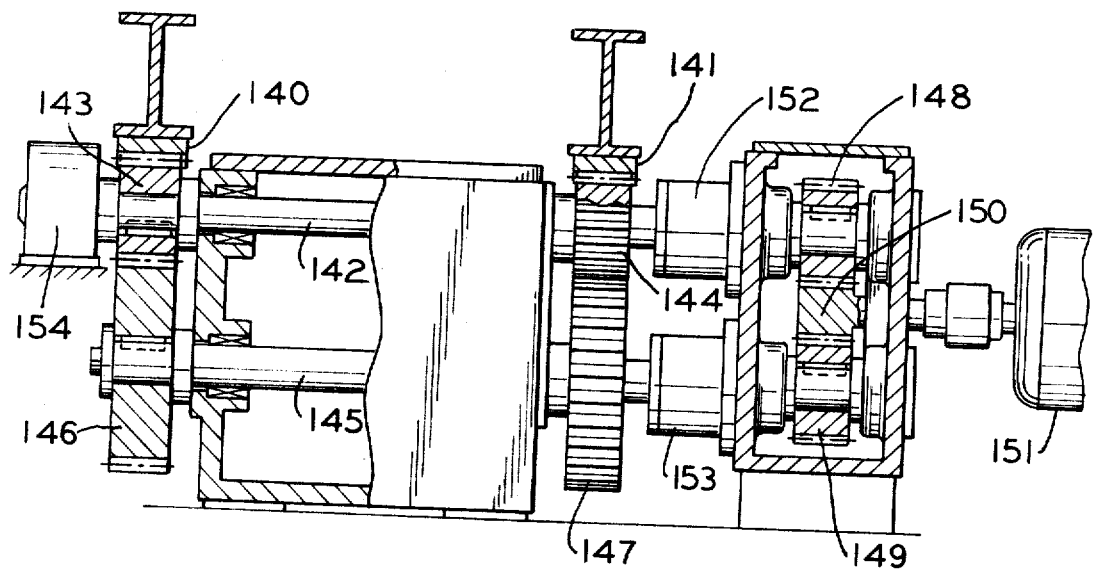
FIG. 22 illustrates a still further type of drive means for reciprocating the walking beams of the FIG. 1 structure.

FIG. 22 illustrates a still further type of beam reciprocating means including gear racks 140,141 on the beams, a transverse shaft 142 having pinion gears 143,144 geared to the racks, a second shaft 145 disposed parallel to the transverse shaft 142 and having pinion gears 146,147 meshed with the respective transverse shaft pinion gears. The common outer free ends of the shafts have pinion gears 148,149 meshed with a common drive pinion gear 150. Drive means 151 for driving the drive pinion gear is provided thus rotating the shafts and thence reciprocating the beams. Clutches 152,153 are interposed on the shafts inwardly of their outer pinion gears. A brake 154 is disposed on the other outer free end of the transverse shaft 142 to brake the same. The brake 154, clutches 152,153, and pinion gears coact in preselected timed sequence to reciprocate the beams in preselected sequence.

An alternate method of forming supporting carriage rollers for low headroom applications is to have the rollers designed as shown in FIGS. 23, 24 and 25. The load bearing member A is supported on the inner bearing 139 as shown, with the outer weels 160,161 traversing over the cam plate. Or they may be reversed with the outer wheels supporting the load bearing members and the inner bearing traversing over the cam plate depending on the design of conveyor.

The walking beams of the invention may be used in a furnace whereby the carriages are reciprocated across the cam plates to move the beams in the vertical plane without moving the beams in a horizontal plane. The purpose of this is to provide alternate support for heated slabs or billets preventing so-called cold-spots.

The number of beams is not limited to two inner and two outer ones, and the configuration of the top of the beams is not limited to the types aforementioned, since there are numerous configurations that can be used.

As a further modification, a plurality of sets of beams of different speeds extending longitudinally, but spaced so that the load can be moved in increasing or decreasing speeds as may be required, by the particular load involved.

What is claimed is:

1. A walking beam conveyor comprising, a base, a plurality of spaced cam plates disposed in line on said base, each cam plate having a top horizontal flat surface including downwardly sloped opposite end portions, interconnected carriages rollably disposed on the top surface of the cam plates for limited longitudinal reciprocable movement thereon, carriage reciprocating means for reciprocating said carriages on the cam plates, at least two pair of inner and outer elongated walking beams rollably disposed on said carriages in parallel horizontal relationship for limited horizontal movement thereon whereby each pair of beams is supported on the interconnected carriages, and beam reciprocating means for moving said beams horizontally, said interconnected carriages moving the respective pairs of beams vertically when the carriages are moving on the respective downwardly sloped end portions of said cam plate top surface, said first and second-named means operating in preselected timed sequence whereby at least one pair of beams is always in contact with an associated load alternately carried by said beams and moving such load horiziontally at constant speed in one horizontal plane, said carriages including spaced pairs of interconnected triangular end plates having rollers disposed at the apexes of each triangle, each pair of end plates being connected together at a common apex.

2. The structure of claim 1 and further including a plurality of sets of inner and outer beams spaced end-to-end and of different speeds to vary the horizontal speed of a load.

3. The structure of claim 1 wherein said carriages are fixed in a horizontal position and the cam plates are reciprocated beneath said carriages to effect the vertical movement of the associated beams.

4. The structure of claim 1 wherein said beam reciprocating means includes gear racks on said beams, a transverse shaft having pinion gears geared to said racks, a second shaft disposed parallel to the transverse shaft and having pinion gears meshed with the respective transverse shaft pinion gears, the common outer free ends of the shafts having pinion gears meshed with a common drive pinion gear, drive means for driving said drive pinion gear and thence rotating the shafts and thence reciprocating the beams, a clutch interposed on the shafts inwardly of their outer pinion gears, and a brake disposed on the other outer free end of the transverse shaft to brake the same, said brake, clutches, and pinion gears coacting in preselected timed sequence to reciprocate said beams in preselected sequence.

5. The structure of claim 1 and further including a truck having a flat bed floor, said conveyor being disposed on said flat bed floor.

6. The structure of claim 5 wherein said walking beams have upwardly protruding elongated channels thereon to facilitate movement of loads thereon.

7. The structure of claim 5 wherein the walking beams include elongated telescopic sections movable rearwardly of the truck to thus extend the floor of the truck rearwardly thereof to facilitate loading of the walking beam and truck.

8. The structure of claim 1 wherein said beam reciprocating means includes gear racks on said inner and outer pairs of beams, a transverse shaft having pinion gears selectively engageable with said respective gear racks, means for selective engaging said pinion gears with either the inner or outer beam gear racks, a differential connected to said shaft, said differential having an input shaft, a transmission gear box connected to said differential input shaft, gear drive means for driving said gear box, and differential drive means for driving the frame of the differential, said differential drive means and said gear box drive means coacting in timed sequence to selectively reciprocate said inner and outer walking beams to move said load.

9. The structure of claim 1 wherein said beam reciprocating means includes a fluid piston-cylinder mechanism for moving the inner walking beams, and a second fluid piston-cylinder mechanism for moving the outer walking beams.

10. The structure of claim 1 wherein said beam reciprocating means includes coacting oppositely spaced linear gear racks on the inner and outer pairs of beams, coacting pinion gears disposed between and geared to respective gear racks, and a fluid piston-cylinder mechanism connected to the inner set of walking beams to reciprocate the same longitudinally, whereby reciprocation of the inner set of beams causes the outer set of beams to reciprocate in the opposite direction in preselected timed sequence to effect movement of the associated load.

11. The structure of claim 1 wherein said beam reciprocating means includes coacting oppositely spaced linear gear racks on the inner and outer pairs of beams, a coacting pair of pinion gears disposed between and geared to the respective gear racks, a transverse bracket connecting the pinion gears, and a fluid piston-cylinder mechanism connected to the bracket intermediate its ends to reciprocate the pinion gears longitudinally of the beams thereby reciprocating the inner and outer pairs of walking beams in opposite directions in preselected timed sequence to effect movement of the associated load.

12. The structure of claim 1 and further including an elongated horizontally movable conveyor belt longitudinally disposed on said beams, whereby the beams move the conveyor belt at a constant speed.

13. The structure of claim 1 and further including a plurality of spaced dog brackets disposed on the beams for receiving and engaging cylindrical objects therein such that the beams are adapted to move such cylindrical objects at a constant speed in a horizontal plane, at spaced intervals.

14. The structure of claim 1 wherein said beam reciprocating means includes gear racks disposed on said pairs of walking beams, a first shaft having pinion gears geared to said outer beams, a second shaft parallel to the first shaft and having pinion gears geared to said inner beams, said shafts having their common ends operatively disposed in a gear box having overriding clutches, and means for reciprocating the inner beams, whereby said inner and outer beams move at the same speed when the inner and outer pairs of beams start to share the load.

* * * * *